US009068877B2

(12) United States Patent
Ross, Jr.

(10) Patent No.: US 9,068,877 B2
(45) Date of Patent: Jun. 30, 2015

(54) LIQUID LEVEL SENDER WITH ADJUSTABLE COUNTERWEIGHT

(75) Inventor: Herbert G. Ross, Jr., Argyle, TX (US)

(73) Assignee: Texas LFP, LLC, Dallas, TX (US)

( * ) Notice: Subject to any disclaimer, the term of this patent is extended or adjusted under 35 U.S.C. 154(b) by 246 days.

(21) Appl. No.: 13/447,174

(22) Filed: Apr. 14, 2012

(65) Prior Publication Data
US 2012/0260730 A1 Oct. 18, 2012

Related U.S. Application Data

(60) Provisional application No. 61/476,080, filed on Apr. 15, 2011.

(51) Int. Cl.
*G01F 23/34* (2006.01)
*G01F 23/32* (2006.01)
*G01F 25/00* (2006.01)

(52) U.S. Cl.
CPC ........... *G01F 23/34* (2013.01); *Y10T 29/49764* (2015.01); *G01F 23/32* (2013.01); *G01F 25/0061* (2013.01)

(58) Field of Classification Search
CPC ......... G01F 23/32; G01F 23/34; G01F 23/00; G01F 25/0061; G01F 23/0038; G01F 23/366; G01F 23/38
USPC ........... 73/305, 306, 317, 322.5, 1.73, 290 R, 73/114.54, 296; 29/407.01
See application file for complete search history.

(56) References Cited

U.S. PATENT DOCUMENTS

| | | | | |
|---|---|---|---|---|
| 2,452,275 | A * | 10/1948 | Woodling | 285/341 |
| 2,584,446 | A * | 2/1952 | Hastings et al. | 73/317 |
| 3,177,715 | A * | 4/1965 | Clark et al. | 73/306 |
| 3,289,477 | A * | 12/1966 | Taylor et al. | 73/322.5 |
| 3,339,413 | A * | 9/1967 | Taylor et al. | 73/317 |
| 3,453,885 | A * | 7/1969 | Taylor et al. | 73/317 |
| 3,589,191 | A * | 6/1971 | Kelch, Jr. | 73/327 |
| 3,601,146 | A * | 8/1971 | Reighard et al. | 137/413 |
| 3,661,276 | A * | 5/1972 | Wiesener | 414/2 |
| 3,756,269 | A * | 9/1973 | Brown | 137/446 |
| 3,933,211 | A * | 1/1976 | Schmid | 177/207 |
| 4,460,031 | A * | 7/1984 | Wiesinger et al. | 164/151.3 |
| 4,635,480 | A * | 1/1987 | Hrncir et al. | 73/322.5 |
| 4,854,340 | A * | 8/1989 | Pavlik | 137/425 |
| 5,072,618 | A * | 12/1991 | Taylor et al. | 73/317 |
| 6,041,650 | A * | 3/2000 | Swindler et al. | 73/317 |
| 6,089,086 | A * | 7/2000 | Swindler et al. | 73/317 |
| 6,170,328 | B1 * | 1/2001 | Ross et al. | 73/305 |
| 6,216,534 | B1 * | 4/2001 | Ross et al. | 73/317 |

(Continued)

FOREIGN PATENT DOCUMENTS

GB 879429 A * 10/1961 ............. G01F 23/36

*Primary Examiner* — Hezron E Williams
*Assistant Examiner* — Marrit Eyassu
(74) *Attorney, Agent, or Firm* — Alvin R. Wirthlin

(57) ABSTRACT

A liquid level sending unit for indicating liquid level within a container includes a mounting base adapted for mounting on a wall of a container, a support member extending from the mounting base, a float arm pivotally mounted to the support member about a pivot axis, a float connected to the float arm on one side of the pivot axis, a first counterweight located on one side of the pivot axis, and a second adjustable counterweight located on an opposite side of the pivot axis. The second counterweight is adjusted along a length of the float arm until a predetermined buoyancy weight of the float is achieved for a particular liquid to be measured.

18 Claims, 4 Drawing Sheets

(56) References Cited

U.S. PATENT DOCUMENTS

| | | | |
|---|---|---|---|
| 6,253,608 B1* | 7/2001 | Faulhaber | 73/305 |
| 6,253,609 B1* | 7/2001 | Ross et al. | 73/305 |
| 6,497,145 B1* | 12/2002 | Ross, Jr. | 73/305 |
| 7,219,546 B2* | 5/2007 | Ross, Jr. | 73/317 |
| 7,726,334 B2* | 6/2010 | Ross et al. | 137/447 |
| 7,921,873 B2* | 4/2011 | Ross et al. | 137/447 |
| 2002/0088278 A1* | 7/2002 | Ross, Jr. | 73/290 R |
| 2003/0084720 A1* | 5/2003 | Ross, Jr. | 73/317 |
| 2003/0106371 A1* | 6/2003 | Housey et al. | 73/317 |
| 2006/0169325 A1* | 8/2006 | Schmitz et al. | 137/413 |
| 2006/0207324 A1* | 9/2006 | Ross, Jr. | 73/317 |
| 2010/0229964 A1* | 9/2010 | Ross et al. | 137/447 |
| 2011/0000297 A1* | 1/2011 | Ford | 73/313 |

\* cited by examiner

US 9,068,877 B2

LIQUID LEVEL SENDER WITH ADJUSTABLE COUNTERWEIGHT

CROSS-REFERENCE TO RELATED APPLICATIONS

This application claims the benefit of U.S. Provisional Application No. 61/476,080 filed on Apr. 15, 2011, the subject matter of which is hereby incorporated by reference in its entirety.

BACKGROUND OF THE INVENTION

Tanks or containers for holding a volume of liquid, such as gasoline, diesel, water, pressurized fluids such as liquefied petroleum gas (LPG), propane, butane, and so on, come in a wide variety of volume capacities an dimensions. A fuel sender is most often associated with these tanks. One type of sending unit includes a float that rides on the surface of the liquid in the tank. The float is connected to one end of a pivot arm which is in turn connected to the lower end of a driven shaft that rotates about its axis in response to float movement. A magnet is typically located at the upper end of the driven shaft for driving an indicator associated with a gauge head when the shaft rotates to display a liquid level condition of the tank to an observer. A counter-weighted yoke is typically connected to the opposite end of the pivot arm on the other side of its pivot axis so that the float sits at the proper level on the liquid being measured. Due to the large variety of tank sizes and liquid types to be measured, and in the interest of economy, a liquid level sending unit can be customized for a particular tank configuration by providing an assortment of different interchangeable parts. Such a sending unit can be readily customized by specifying a tank size, driven shaft length, float length, and float arm length.

Depending on the particular float length and float arm length selected, as well as the particular fluid to be measured, different float materials, and so on, different gravitational forces will be present on the float, thus causing the float to sink into the fluid or rise above the fluid level. Accordingly, it is important to adjust the counterweight associated with the yoke so that the float rests at the proper position on top of the liquid surface with a predetermined portion or volume of the float located below the liquid surface.

However, adjusting the counterweight on the yoke is a very labor-intensive and time-consuming process and usually involves determining the weight of the float at the end of the pivot arm, removing material from the counterweight associated with the yoke, determining the new weight of the float, removing more material, and so on, until the proper float weight for the liquid to be measured has been reached. If too much material has been removed, new or additional counterweights must be added and the adjustment process started over again for the new weight.

It would therefore be desirous to provide a simple, straight forward solution that would reduce the time involved in counterbalancing the float.

SUMMARY OF THE INVENTION

In accordance with one aspect of the invention, a liquid level sending unit for indicating liquid level within a container includes a mounting base adapted for mounting on a wall of a container, a support member extending from the mounting base, a float arm pivotally mounted to the support member about a pivot axis, a float connected to the float arm on one side of the pivot axis, and at least one counterweight connected to the float arm. The counterweight is adjustable along the float arm to thereby vary a buoyancy weight of the float for a particular liquid to be measured.

In accordance with another aspect of the invention, a liquid level sending unit for indicating liquid level within a container includes a mounting base adapted for mounting on a wall of a container, a gauge head connected to one side of the mounting base, a support member extending from the opposite side of the mounting base, and a float arm pivotally mounted to the support member about a pivot axis. The float arm is operably connected to the gauge head for indicating liquid level within a container. A float is connected to the float arm on one side of the pivot axis. A first counterweight is connected to the float arm on an opposite side of the pivot axis for counterbalancing the float. A second counterweight is connected to the float arm between the pivot axis and the float. The second counterweight is adjustable along the float arm to thereby vary a buoyancy weight of the float for a particular liquid to be measured. The second counterweight includes a first coupler having a first bore extending therethrough for slidably receiving the float arm, the first bore including an internally threaded portion and a step, a second coupler having an externally threaded projection for engaging the internally threaded portion and a second bore extending therethrough for slidably receiving the float arm, and a collar located between a face of the projection and the step. The collar is wedged against the float arm when the couplers are tightened together to thereby fix the first and second couplers at a location on the float arm based on a predetermined buoyancy weight of the float.

In accordance with a further aspect of the invention, a method of assembling a liquid level sending unit for use in a tank includes selecting a float arm of a predetermined length for a particular tank size, pivotally connecting the float arm to a support member about a pivot axis, the support member being adapted to extend into the tank, connecting a counterweight to the float arm, selecting a float corresponding to a particular liquid to be measured, installing the float on the float arm, determining a buoyancy weight of the float, and moving the counterweight along the float arm until the buoyancy weight of the float is attained.

BRIEF DESCRIPTION OF THE DRAWINGS

The following detailed description of the preferred embodiments of the present invention will be best understood when considered in conjunction with the accompanying drawings, wherein like designations denote like elements throughout the drawings, and wherein.

It is noted that the drawings are intended to depict only exemplary embodiments of the invention and therefore should not be considered as limiting the scope thereof. It is further noted that the drawings may not necessarily be to scale. The invention will now be described in greater detail with reference to the accompanying drawings.

DETAILED DESCRIPTION OF THE INVENTION

Figure 1:
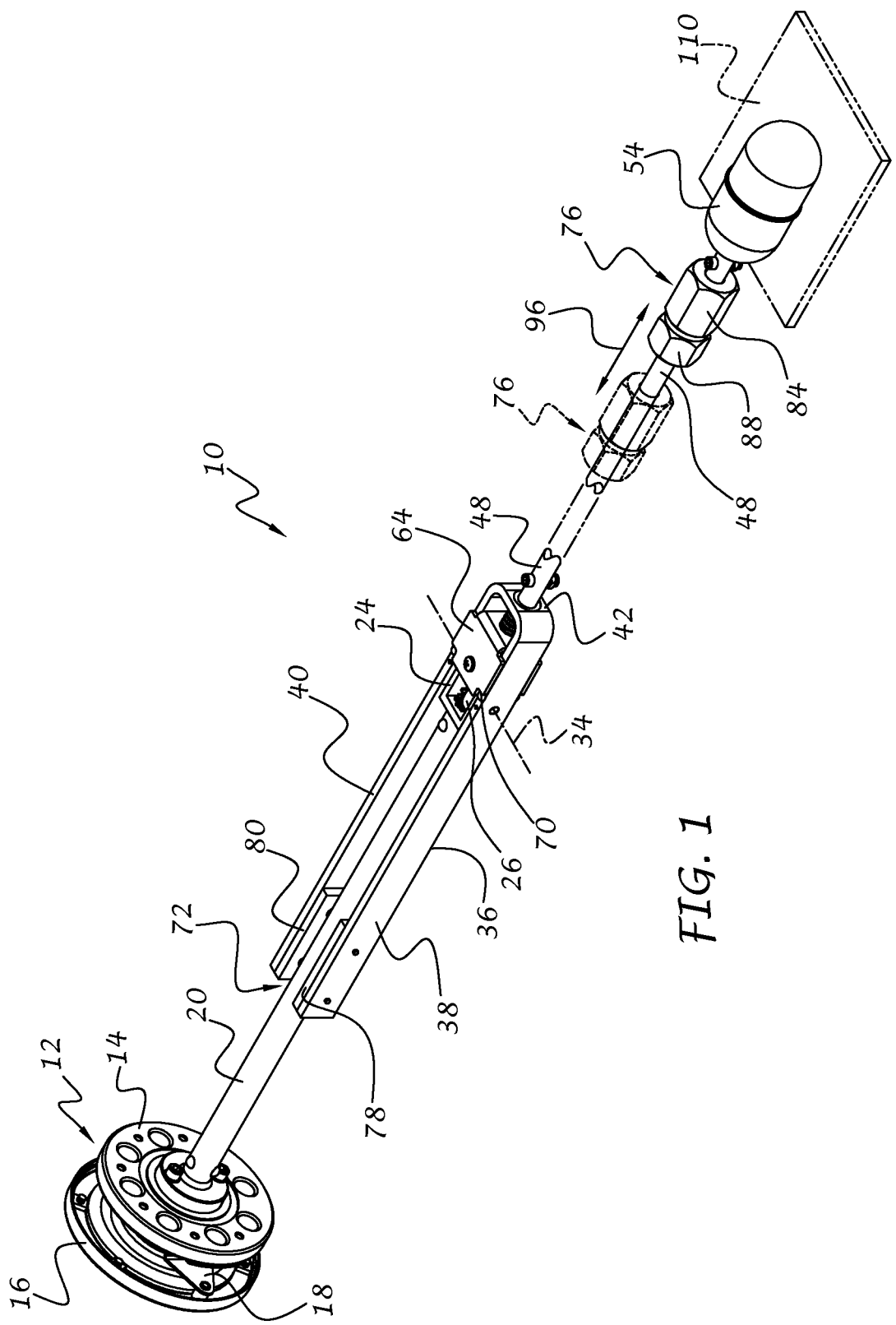
FIG. 1 is an isometric view of a liquid level sending unit with an adjustable counterweight assembly in accordance with the present invention, shown during calibration.
Figure 2:
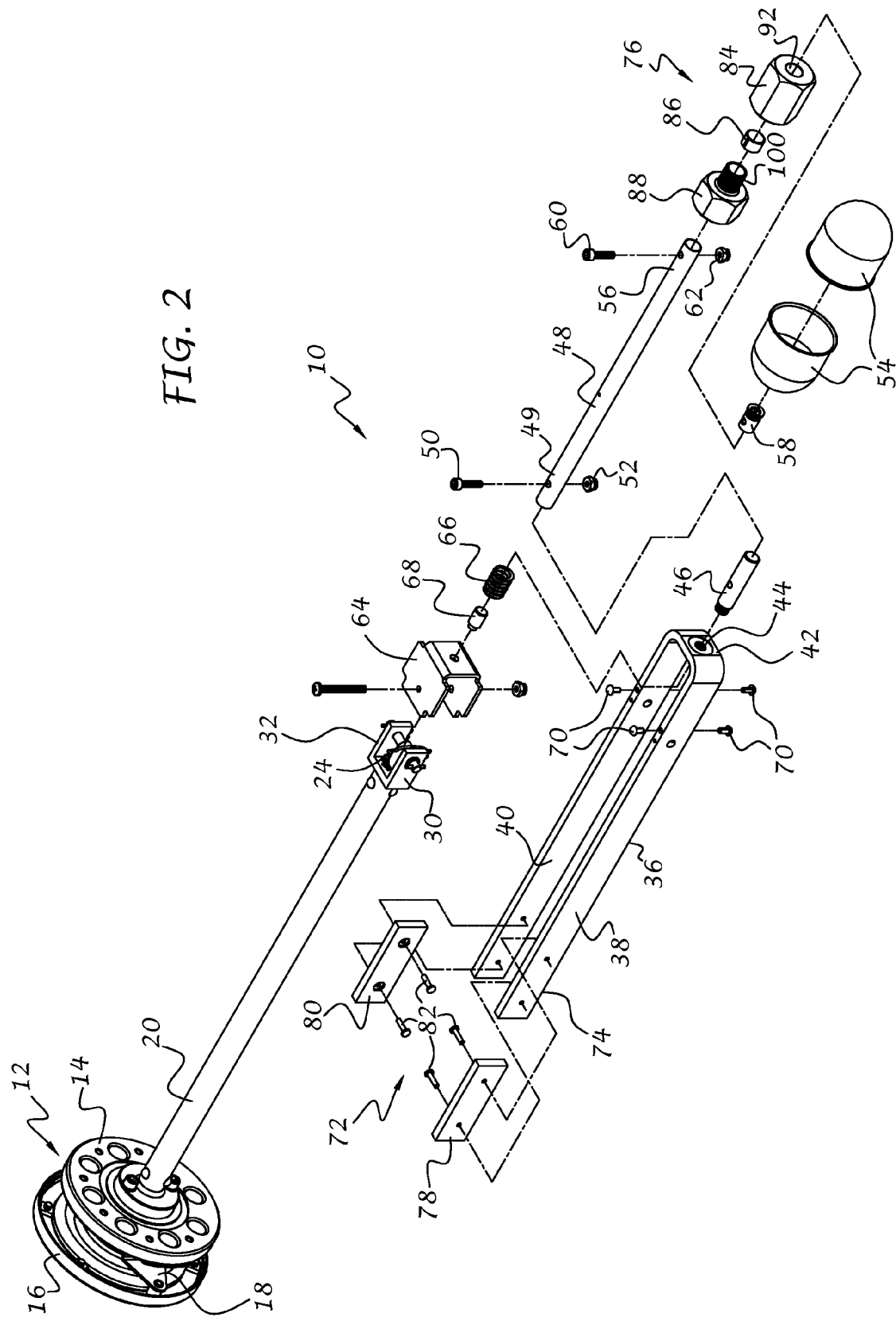
FIG. 2 is an isometric exploded view of the liquid level sending unit with adjustable counterweight assembly.

Referring now to the drawings, and to FIGS. 1 and 2 in particular, a liquid level sending unit 10 in accordance with an exemplary embodiment of the present invention is illustrated. The sending unit 10 is preferably operable for indicating the level of liquid in a container, such as a fuel tank, oil reservoir, radiator, brake fluid chamber, or any other container for holding and/or transporting a liquid (not shown). In accordance with one preferred application of the invention, the sending unit 10 is adaptable to tanks having a wide variety of different shapes and sizes and therefore preferably includes a number of interchangeable components, as will be briefly described, for accommodating a particular tank configuration. However, it will be understood that the sending unit 10 of the present invention can be used with any float-type liquid level transducer in practically any application and/or location where indication of liquid level is desirous.

Figure 3:
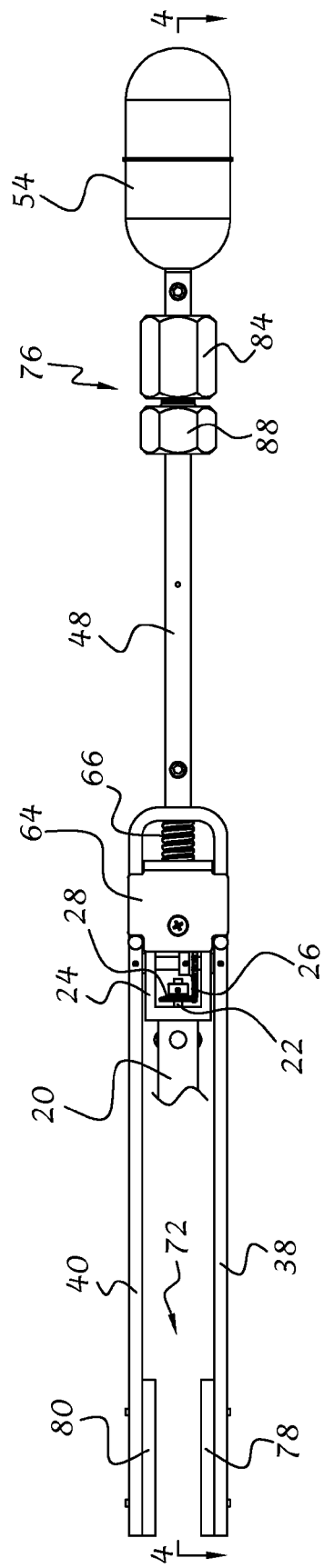
FIG. 3 is a top plan view of the float and counterbalancing components that form part of the liquid level sending unit of FIG. 1.
Figure 4:
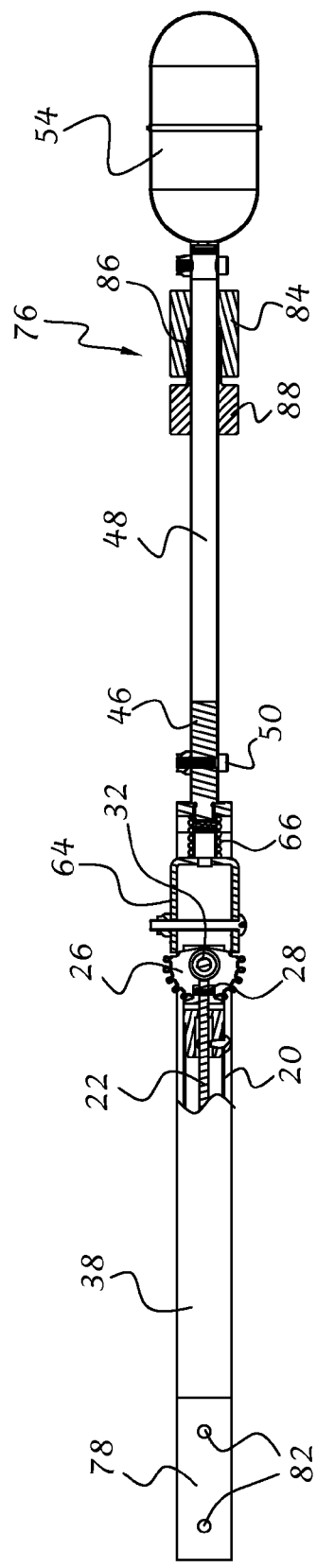
FIG. 4 is a partial sectional view thereof taken along line 4-4 of FIG. 3.

With additional reference to FIGS. 3 and 4, the sending unit 10 preferably includes a gauge head 12 with a mounting base 14 (FIGS. 1 and 2) adapted for mounting on the wall of a tank (not shown) or other container, an indicator dial 16 for visually indicating liquid level within the tank in a well-known manner, and a pair of diametrically opposed brackets 18 (only one shown) that extend between the mounting base 14 and indicator dial 16 for securing the mounting base and indicator dial assembly together. A tubular support member 20 extends downwardly from the gauge head 12 and houses a driven shaft 22 (FIGS. 3 and 4) that drives the indicator dial 16 through magnetic coupling, mechanical connection, optical sensing or other well-known means for coupling the driven shaft to the indicator dial. The tubular support member 20 and driven shaft 22 can be provided in different lengths to accommodate a wide variety of different tank depths.

A gear assembly 24 is located at a lower end of the tubular member 20 and includes a driving gear 26 rotatably connected to an inner yoke 30 and a driven gear 28 connected to the driven shaft 22 for rotation therewith. The driving gear 26 and driven gear 28 are coupled together such that rotational movement of the driving gear results in proportional rotational movement of the driven gear 28 and thus rotation of the shaft 22 to drive the indicator dial 16. The inner yoke 30 is connected to the lower end of the tubular member 20. The driving gear 26 is rotatably connected to the inner yoke 30 via a pivot pin 32 that extends through the driving gear 26 and inner yoke 30. The driving gear 26 is preferably fixedly connected to the pivot pin which is in turn rotatably connected to the inner yoke 30 about a pivot axis 34 (FIG. 1).

An outer yoke 36 includes a pair of arms 38, 40 that are fixedly connected to the pivot pin 32 for rotation therewith about the pivot axis 34. A cross member 42 extends between the arms 38, 40 and includes a threaded opening 44 (FIG. 2) for receiving the threaded end of an insert 46. A float rod 48 has a proximal end 49 that is preferably received over the insert and secured thereto with a bolt 50 that extends through the float rod 48 and insert 46. A nut 52 is received on the end of the bolt 50 to thereby securely connect the float rod 48 to the outer yoke 36. The float rod 48 can be provided in different lengths to accommodate a wide variety of different tank sizes and configurations.

A float 54 is connected to a distal end 56 of the float rod 48 via an insert 58 that is connected to the float and received in the distal end 56 of the float rod. A bolt 60 extends through the float rod 48 and insert 58 and a nut 62 is received on the end of the bolt 60 to thereby securely connect the float 54 to the float rod 48. The float 54 can be provided in different lengths, widths, shapes, configurations, materials, densities, can be solid or hollow, and so on, to accommodate a wide variety of different liquids to be measured.

A U-shaped bracket 64 fits within the outer yoke 36 and is biased toward the gear assembly 24 by a compression spring 66 located between the cross member 42 and the bracket 64. A spring guide 68 is connected to the bracket 64 and extends into the spring 66. Stop members 70 are preferably mounted on the arms 38, 40 to limit bracket travel toward the gear assembly.

A first counterweight assembly 72 is preferably connected to a distal end 74 of the outer yoke 36 and a second counterweight assembly 76 is preferably connected to the float rod 48. The first counterweight assembly 72 preferably includes a first weight portion 78 connected to the yoke arm 38 and a second weight portion 80 connected to the yoke arm 40, preferably via fasteners 82, such as rivets. However, it will be understood that one or both weight portions can be connected to the arms 38, 40 via threaded fasteners, clamps, welding, adhesive bonding, and other connection means, as well as being integrally formed or machined with the yoke arms, without departing from the spirit and scope of the invention. It will be further understood that a single weight portion can be used or both weight portions can be eliminated when the arms 38, 40 are sufficiently heavy to counteract the forces applied by the float and float rod. In addition, it will be understood that one of the yoke arms can be eliminated if a single yoke arm and/or weight are sufficient to counteract the float and float rod forces.

Figure 5:
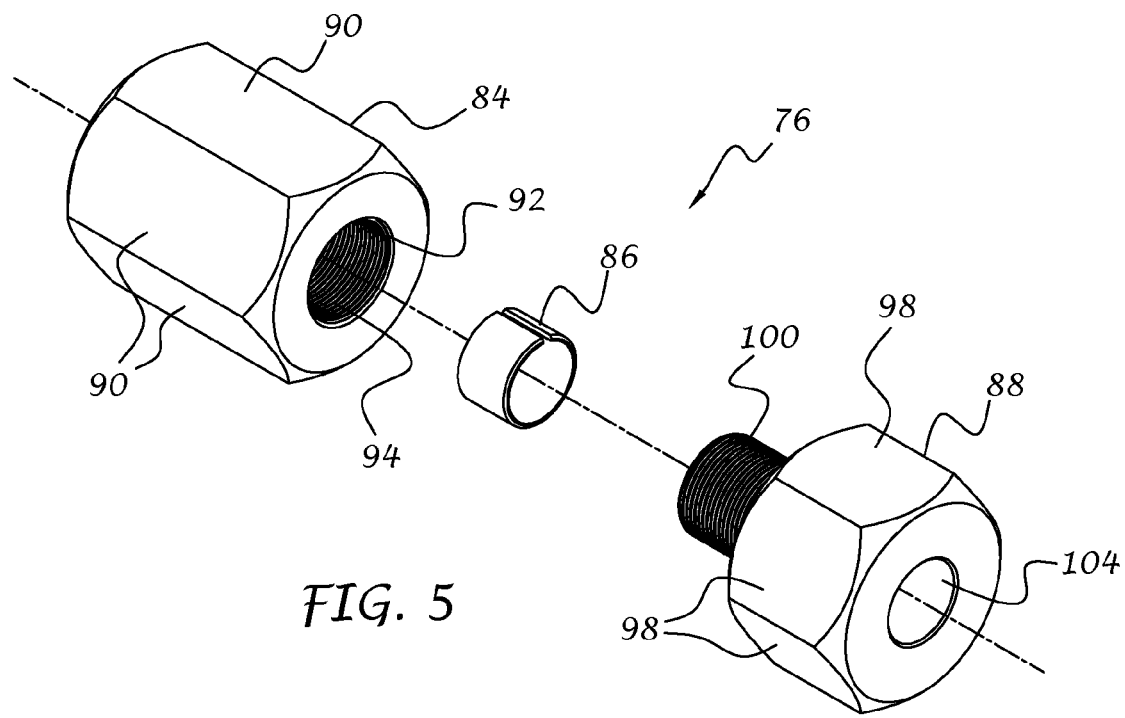
FIG. 5 is an exploded isometric view of the adjustable counterweight assembly.
Figure 6:
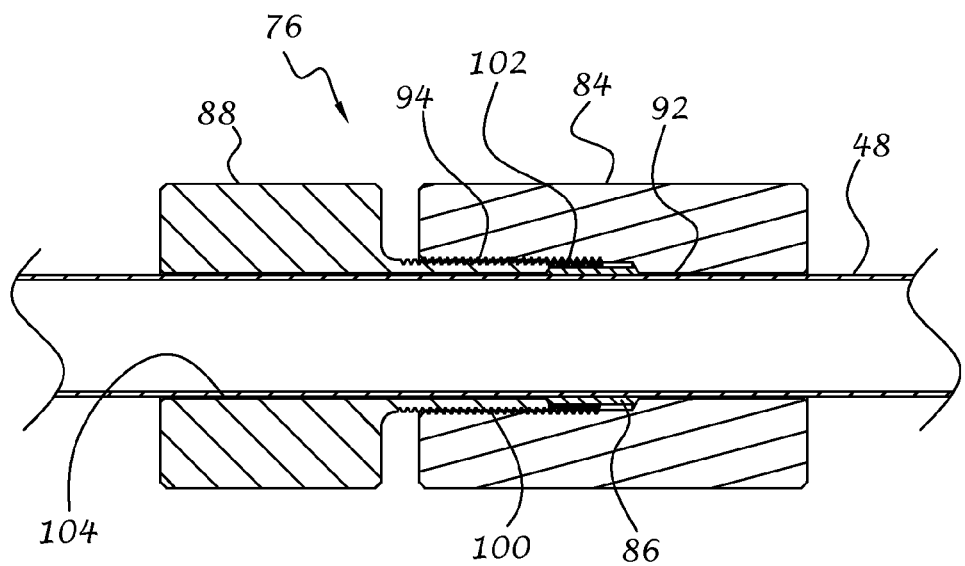
FIG. 6 is an enlarged sectional view of the adjustable counterweight assembly installed on a float rod.

With particular reference to FIGS. 2, 5 and 6, the second counterweight assembly 76 preferably includes a first coupler 84, a split collar 86 located within the first coupler 84, and a second coupler 88 for engagement with the first coupler and sleeve.

The first coupler 84 preferably includes a generally cylindrically-shaped body with engagement surfaces 90 for securing the first and second couplers together with a wrench or the like. A bore 92 extends through the body and includes an internally threaded portion 94. As shown in FIG. 6, the bore 92 is sized to receive the float rod 48 in relative sliding engagement so that the first coupler 84 can be adjusted along the length of the float rod.

The second coupler 88 preferably includes a generally cylindrically-shaped body with flat engagement surfaces 98 for securing the first and second couplers together with a wrench or the like. An externally threaded projection 100 of the second coupler 88 is sized to engage the internally threaded portion 94 of the first coupler. A bore 104 extends through the body of the second coupler, including the externally threaded projection 100. The bore 104 is sized to receive the float rod 48 in relative sliding engagement so that the second coupler 88 can be adjusted along the length of the float rod. A front face 102 of the projection 100 is adapted to press the split collar 86 against an internal face or step 103 (FIG. 6) of the bore 92 when installed in the first coupler 84 to thereby wedge the collar against the float rod and the couplers, thereby securing the second counterweight assembly at a predetermined location on the float rod 48.

Referring again to FIGS. 1 and 2, during assembly of the sending unit 10, a tubular member 20 and driven shaft 22 having a particular length dependent on the depth of the tank is selected and installed on the gauge head 12. A float rod 48 having a particular length dependent on the size and/or configuration of the tank is selected and installed on the outer yoke 36 together with one or more weight portions 78, 80 of the first counterweight assembly 72. The second counterweight assembly 76 is then slid onto the float rod 48. A float 54 is then selected with a particular size, weight, material, density, and/or configuration depending on the type of liquid to be measured, and then connected to the distal end 56 of the float rod. The position of the second counterweight assembly 76 is preferably determined by the buoyancy weight of the float. The buoyancy weight of the float is in turn determined by the weight of first and second counterweight assemblies, which equals the weight of the fluid to be displaced by the volume of float immersed, such as around 50% to 80% of the float volume. Once the weight of the displaced fluid is determined, a method to determine the position of the second counterweight assembly 76, in accordance with the invention, includes weighing the float and its attached components, e.g. the float arm and first counterweight assembly, on a scale 110 (shown in broken line in FIG. 1) or the like, then sliding the second counterweight assembly 76 along the float rod 48, as represented by arrows 96 in FIG. 1, until the scale is at the proper reading in accordance with the predetermined buoyancy weight. No adjustment to the first counterweight assembly, as required with prior art solutions, is necessary.

In accordance with a further embodiment of the invention, the position of the second counterweight assembly 76 is calculated in accordance with the predetermined buoyancy weight. The second counterweight assembly 76 is then moved along the float rod 48 to the calculated position by measuring with a tape measure, a special calibrated fixture with lengths, graduated marks on the float rod, a coordinate or linear measuring or positioning machine, and so on.

The second counterweight assembly is then secured at the adjusted position. In some instances, the second counterweight assembly can be hand-tightened to achieve sufficient force to hold the second counterweight assembly in position. In other instances, a wrench or the like may be needed to secure the second counterweight assembly in position. When the scale 110 is at the proper reading for the selected configuration and calibration, the float 54 will be at the proper position on the surface of the liquid being measured to thereby transmit an accurate liquid level reading to the indicator dial 16.

It will be understood that the term "preferably" as used throughout the specification refers to one or more exemplary embodiments of the invention and therefore is not to be interpreted in any limiting sense.

It will be further understood that the term "connect" and its derivatives refers to two or more parts capable of being attached together either directly or indirectly through one or more intermediate members. In addition, terms of orientation and/or position as may be used throughout the specification denote relative, rather than absolute orientations and/or positions.

It will be appreciated by those skilled in the art that changes could be made to the embodiments described above without departing from the broad inventive concept thereof. For example, although the second counterweight assembly is shown as a three-piece compression unit, a single collar with a locking screw or the like can be used without departing from the spirit and scope of the present invention. Moreover, it is contemplated that other counterweight configurations and means for adjusting the counterweight along the float rod and/or along one or more of the arms can be implemented without departing from the spirit and scope of the invention. Moreover, the liquid level sender is not limited to the embodiments described above but may include any type of fuel sender construction that utilizes a float and pivot arm. It will be understood, therefore, that this invention is not limited to the particular embodiments disclosed, but it is intended to cover modifications within the spirit and scope of the present invention as defined by the appended claims.

What is claimed is:

1. A liquid level sending unit for indicating liquid level within a container, comprising:
    a mounting base adapted for mounting on a wall of a container;
    a support member extending from the mounting base;
    a float arm pivotally mounted to the support member about a pivot axis;
    a float connected to the float arm for pivoting movement therewith;
    a first counterweight connected to the float arm; and
    a second counterweight connected to the float arm, the second counterweight being adjustable along the float arm to either increase or decrease a distance between the pivot axis and the second counterweight to thereby vary a buoyancy weight of the float for a particular liquid to be measured.

2. A liquid level sending unit according to claim 1, wherein the second counterweight is connected to the float arm on one side of the pivot axis between the pivot axis and the float.

3. A liquid level sending unit according to claim 2, wherein the first counterweight is connected to the float arm on the other side of the pivot axis.

4. A liquid level sending unit according to claim 3, wherein the second counterweight comprises:
    a first coupler having a first bore for slidably receiving the float arm; and
    a second coupler having a second bore for slidably receiving the float arm, the first and second couplers being connectable to each other to thereby fix the first and second couplers on the float arm at a predetermined position dependent on a predetermined buoyancy weight of the float for the particular liquid being measured.

5. A liquid level sending unit according to claim 4, wherein the second counterweight further comprises a collar located between the first and second couplers for engaging the float arm under compression when the first and second couplers are connected together.

6. A liquid level sending unit according to claim 5, wherein the first coupler comprises an internally threaded portion and the second coupler comprises an externally threaded projecting for engaging the internally threaded portion.

7. A liquid level sending unit according to claim 6, wherein the first bore comprises an internal step and the projection comprises a face, the collar being wedged between the face and the step to thereby wedge the collar against the float rod and the couplers.

8. A liquid level sending unit according to claim 7, wherein the collar comprises a split collar.

9. A liquid level sending unit according to claim 5, wherein the collar comprises a split collar.

10. A liquid level sending unit according to claim 1, and further comprising a gauge head connected to the mounting base for indicating liquid level within the container.

11. A liquid level sending unit for indicating liquid level within a container, comprising:
    a mounting base adapted for mounting on a wall of a container;
    a gauge head connected to one side of the mounting base;
    a support member extending from the opposite side of the mounting base;

a float arm pivotally mounted to the support member about a pivot axis, the float arm being operably connected to the gauge head for indicating liquid level within a container;

a float connected to the float arm on one side of the pivot axis;

a first counterweight connected to the float arm on an opposite side of the pivot axis for counterbalancing the float;

a second counterweight connected to the float arm between the pivot axis and the float, the second counterweight being adjustable along the float arm to thereby vary a buoyancy weight of the float for a particular liquid to be measured, the second counterweight comprising:

a first coupler having a first bore extending therethrough for slidably receiving the float arm, the first bore including an internally threaded portion and a step;

a second coupler having an externally threaded projection for engaging the internally threaded portion and a second bore extending therethrough for slidably receiving the float arm; and a collar located between a face of the projection and the step;

wherein the collar is wedged against the float arm when the couplers are tightened together to thereby fix the first and second couplers at a location on the float arm based on a predetermined buoyancy weight of the float.

12. A liquid level sending unit according to claim 11, wherein the collar comprises a split collar.

13. A method of assembling a liquid level sending unit for use in a tank, the method comprising:

selecting a float arm of a predetermined length for a particular tank size;

pivotally connecting the float arm to a support member about a pivot axis, the support member being adapted to extend into the tank;

connecting a first counterweight to the float arm;

connecting a second counterweight to the float arm;

selecting a float corresponding to a particular liquid to be measured;

installing the float on the float arm;

determining a buoyancy weight of the float; and moving the second counterweight along the float arm until the buoyancy weight of the float is attained.

14. A method according to claim 13, wherein the step for connecting the second counterweight comprises slidably connecting the second counterweight to the float arm on one side of the pivot axis between the pivot axis and the float.

15. A method according to claim 14, wherein the step of connecting the first counterweight comprises connecting the first counterweight to the float arm on the other side of the pivot axis.

16. A method according to claim 15, wherein the first counterweight is fixedly connected to the float arm.

17. A method according to claim 14, wherein the buoyancy weight of the float is measured by placing the float on a scale.

18. A method according to claim 14, and further comprising:

calculating a position of the counterweight on the float arm dependent on the determined buoyancy weight; and locating the counterweight on the float arm at the calculated position.

* * * * *